United States Patent [19]

Langley

[11] Patent Number: 4,670,073
[45] Date of Patent: Jun. 2, 1987

[54] BONDING MAN-MADE FABRICS TO FORM PROTECTIVE GARMENTS WITHOUT USE OF STITCHING

[75] Inventor: John D. Langley, Guntersville, Ala.

[73] Assignee: Kappler, Inc., Guntersville, Ala.

[21] Appl. No.: 718,791

[22] Filed: Apr. 1, 1985

[51] Int. Cl.$^4$ .................. B29C 65/08; B32B 31/20
[52] U.S. Cl. ........................... 156/73.1; 2/275; 156/73.2; 156/73.4; 156/157; 156/216
[58] Field of Search ............ 156/73.1, 73.2, 73.3, 156/73.4, 157, 580.1, 580.2, 216, 218; 264/23; 2/275

[56] References Cited

U.S. PATENT DOCUMENTS

| | | | |
|---|---|---|---|
| 3,026,225 | 3/1962 | Ostby, Jr. | 2/275 |
| 3,312,250 | 4/1967 | Sirignano et al. | 156/73.2 |
| 3,874,963 | 4/1975 | Barger | 156/73.4 |
| 4,272,851 | 6/1981 | Goldstein | 2/275 |

*Primary Examiner*—Michael Wityshyn
*Attorney, Agent, or Firm*—C. A. Phillips

[57] ABSTRACT

A method for bonding seams in protective garments without use of any stitching, by applying high-frequency ultrasonic waves of pressure to overlapping edges of fabric of non-woven spunbonded olefin or polyolefin having laminated to one side thereof a polyethylene or polyvinylidine chloride film.

2 Claims, 3 Drawing Figures

BONDING MAN-MADE FABRICS TO FORM PROTECTIVE GARMENTS WITHOUT USE OF STITCHING

BACKGROUND OF THE INVENTION

1. Field of the Invention

This invention relates to new methods or processes for bonding seams in protective garments made of man-made fabrics such as a non-woven spunbonded olefin having one laminated side and one unlaminated side, in which such bonding is efficiently and effectively accomplished without undesirable hole-creating stitching.

2. Description of the Prior Act

In various industries, it is necessary for certain employees and others to be in close proximity to hazardous chemicals and other hazardous matter. Local, state, and federal laws and/or regulations often require the use of protective garments under such circumstances. It is frequently not feasible to utilize "permanent" protective garments because of the necessity to decontaminate the garments regularly, which may be impossible or prohibitively expensive. A widely used alternative to such permanent protective garments is the disposable garment, made of man-made materials which are lightweight, resistant to tearing and abrasion, and relatively impermeable to hazardous substances. Such synthetic fabrics are available, such as spunbounded olefin, which are very satisfactory. They are good barriers to particulates and a broad range of chemicals, have high tensile strength and tear resistance, are light weight and dyeable, and are reasonably economical. An example of this synthetic fabric is sold by E. I. du Pont de Nemours & Co. under its trademark Tyvek, to which may be added a polyethylene or polyvinylidine chloride film coat or lamination on one of its two sides to make it even more impervious to hazardous substances.

A technical problem in using such synthetic fabrics is how to form garments therefrom without significant loss of the favorable properties of the fabrics. In virtually all instances, a stitching process is used in whole or in substantial part to form garments from such synthetic materials so that they will conform generally to the shape of the human body. However, the stitching process obviously results in the creation of many holes in the fabric which are points of vulnerability through which hazardous gases, liquids and some small solid particulates can penetrate, with possible damage to the body or inner clothing, or both, of the person wearing the protective garment. It is thus desirable to minimize to the extent possible the use of traditional stitching methods which create such vulnerable holes.

One patent, Goldstein U.S. Pat. No. 4,272,851, attempts to solve this problem by ultrasonically bonding together edges of synthetic fabric, preferably polyethylene coated (laminated) Tyvek. However, Goldstein suggests the ultrasonic bonding of congruent edges of the Tyvek, presumably laminated side to laminated side. This procedure results in a seam which has inadequate resistance to rupture from shearing. In order to give greater strength against shear stresses, Goldstein adds a binding along the folded back seam, which binding is sewed on by traditional stitching means. While the multiple layers so stitched may be somewhat more protective than earlier stitching methods, it is still possible for hazardous chemicals and substances to get inside the garment through the holes created by sewing.

There has not existed prior to the present invention any means of totally eliminating stitching along the seams of protective garments made with spunbonded olefin or polyolefin fabrics so as to eliminate holes created by the stitching.

SUMMARY OF THE INVENTION

It is an object of the invention to provide a method for bonding any seams of synthetic fabric in a manner that does not result in holes, which holes impair the protective qualities of protective garments made from such synthetic fabric.

It is a further object of this invention to provide an efficient method of binding together the closing seam of a part of such protective garment, such closing seams (for example, closing the sleeves or legs of a garment) presenting special problems which are solved by the present invention.

Briefly, but not by way of limitation, the present invention provides a method for bonding overlapping edges of parts of garments, as opposed to congruent edges, using ultrasonically bondable fabric. For example, it is found that in the case of non-woven spunbonded olefin with one laminated side and one unlaminated side, ultrasonic bonding can be accomplished by overlapping the fabric edges so that a laminated fabric side overlies and is in contact with an unlaminated side of the other piece of synthetic fabric to be bonded, or vice versa. The bond thus obtained is very strong and is adequately resistant to shearing stresses, thus eliminating the need for stitching to strengthen the seam against possible shearing. While a single seam is ordinarily sufficient, it may be desirable to use two or more seams for additional strength or for neatness in bonding both overlapping edges along their respective extremities. Such multiple bonding can be achieved by repetition of the process described above. In order more easily to apply the ultrasound and pressure (for a second or subsequent seam) accurately along the edge of the fabric on the reverse side from that on which the first seam was made, the fabric can be turned over and the seam made on such reverse side in the same manner as the first seam on the opposite side. When a closing seam is to be made by the method described above, as on a sleeve or leg, it may be awkward or even impossible to pass the fabric through the ultrasonic bonding means as one would do in the case of open seams. This problem is solved in the present invention by overlapping the fabric edges as stated above and then folding one of the two ends of the fabric underneath the overlapped edges so that there are three layers of fabric one above the other in the vicinity of the edges in such manner that a laminated and unlaminated side are in contact with each other on the overlapping edges while an unlaminated side of the folded-under portion is in contact with an unlaminated adjacent part forming one of the overlapping edges. In such configuration ultrasonic waves and pressure are applied to the three layers. It is found that ultrasonic bonding will occur between the overlapping edges where laminated and unlaminated sides are in contact with each other, but that little or no ultrasonic bonding occurs between the folded-under fabric and either of the overlapping edges where unlaminated sides only are in contact with each other. To the extent any slight bonding takes places between the unlaminated surfaces, a slight shearing force can be applied which unfolds the folded-under portion, without in any way disturbing the secure bond achieved between the overlapping edges which it was the purpose of the invention to produce. This very satisfactorily closes the seam ultrasonically which otherwise would be difficult or impossible to do.

DETAILED DESCRIPTION OF THE INVENTION

Figure 1:
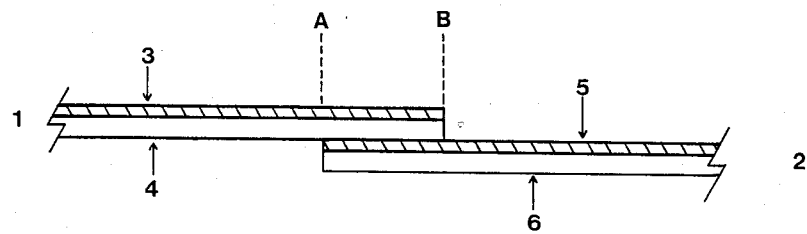
FIG. 1 is an enlarged cross-sectional view of two overlapping edges of man-made fabric in which an unlaminated side of one edge is in contact with a laminated side of the other overlapping edge in the area of the overlap.

Referring to the drawing, FIG. 1 shows fabric 1 and fabric 2 overlapping in the space A-B. The fabrics are of the same man-made material having one side laminated with a plastic-like coating and the other side unlaminated. In its preferred embodiment, the fabrics are of a non-woven spunbonded olefin Tyvek with polyethylene or polyvinylidine chloride laminated to one side thereof as aforesaid; but the fabrics may be of any material such that like laminated sides may be ultrasonically bonded together and in which a laminated side can be ultrasonically bonded to an unlaminated side, but in which an unlaminated side cannot be ultrasonically bonded securely to an unlaminated side under conditions which permit ultrasonic bonding of other permutations of sides. It will be observed in FIG. 1 that, in order to produce a protective garment with lamination on the same side (outside or inside) of the finished garment, the overlapping must be done so that surfaces 3 and 5 are both either laminated or unlaminated and surfaces 4 and 6 are also alike, being the converse of surfaces 3 and 5. Hence, if surface 4 is laminated, surface 5 to which it is to be bonded in the area A-B will be unlaminated. Conversely, if surface 4 is unlaminated, then surface 5 to which it is to be bonded will be laminated. In any event, one of surfaces 4 and 5 will be laminated and the other unlaminated. Heretofore, it has been thought that such unlike surfaces could not be satisfactorily bonded by ultrasound. However, in accordance with the present invention, a combination of ultrasound and pressure such as a tension driving roller applied to the overlapping edges A-B will result in excellent bonding between a laminated surface and an unlaminated surface, using, for example, a standard ultrasonic sealing machine. Such an ultrasonic sealing machine can thus effectively serve as a sewing machine which does not produce any holes. Multiple seams can be made by repetition of the above-described process. For example, if the first seam is made generally along edge B, a second seam can be made along edge A, or vice versa, by the same process. In making the seam along edge A, it may be easier to turn the fabric over (a bonded seam having already been made along edge B) in order more accurately to follow edge A in making a second seam.

Figure 2:
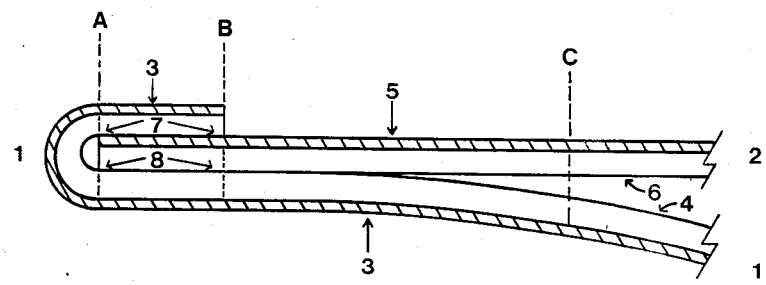
FIG. 2 is an enlarged cross-sectional view of two overlapping edges of man-made fabric similar to FIG. 1, except that fabric 1 has been folded under the overlapping edges A-B.

As noted earlier, special problems exist when a closing seam is being made because the fabric joined together in a continuous loop or other continuous configuration may prevent or make difficult the feeding of the fabric through the sealing machine or other devices to accomplish the desired bonding along the closing seam. FIG. 2 illustrates in part the manner in which such problems are solved in accordance with the present invention. Fabric 1 is folded under the overlapping edges A-B so that unlike surfaces (i.e., one laminated and one unlaminated) 4 and 5 are in contact with each other in plane 7 between A-B and like surfaces 4 and 6 are in contact with each other in plane 8 between A-B. Whereas, in FIG. 1, it is immaterial whether surfaces 4 or 5 is laminated as long as one is laminated and the other is unlaminated, the present invention requires that in FIG. 2 surface 3 must be laminated, surface 4 unlaminated, surface 5 laminated and surface 6 unlaminated. Thus, a laminated surface 5 and an unlaminated surface 4 will be in contact with each other along plane 7 and two unlaminated surfaces (4 and 6) will be in contact with each other along plane 8 between A-B. With the fabrics 1 and 2 held in the position shown in FIG. 2, the three-layer fold A-B is subjected to a combination of ultrasound and pressure by a standard ultrasonic sealing machine or otherwise as described in the next preceding paragraph above. In accordance with the present invention, secure bonding will be effected in plane 7 between surfaces 4 and 5 in the area of the overlapping edges A-B, but little or no bonding will occur in plane 8 between surfaces 4 and 6, so that surfaces 4 and 6 can be unfolded readily with the result that the desired seam has been achieved in plane 7 without undesirable bonding in plane 8, thus enabling one to make the closing seam in an efficient and effective manner.

Figure 3:
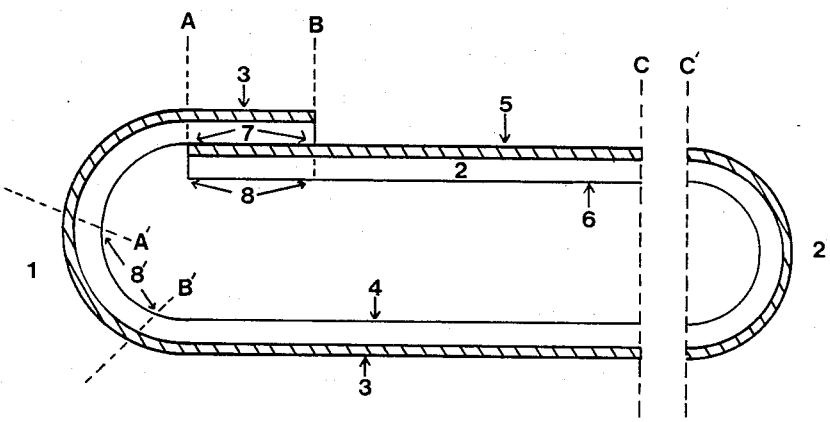
FIG. 3 is an enlarged cross-sectional view of a part of a garment having a closing seam A-B so that fabric 1 and fabric 2 are parts of a continuous closed configuration of fabric, as in a sleeve or leg part of a garment.

Occasionally, a slight amount of bonding will occur in plane 8 between surfaces 4 and 6 under the circumstances described in the next preceding paragraph. In such event, the bonding will be sufficiently weak so that surfaces 4 and 6 can be easily separated by pulling apart fabrics 1 and 2 in the unbonded area B-C, which will exert a shearing force on the slight bond of plane 8 between A-B and thus separate surfaces 4 and 6. Of course, any other means for separation can be used, such as inserting a wedge or cone between surfaces 4 and 6. FIG. 3 illustrates a closed continuous loop or other closed cntinuous configuration wherein bonding has been achieved between surfaces 4 and 5 as described in the immediately preceding paragraph, and in which the surfaces 4 and 6 have been separated from each other from plane 8 wherein they were formerly in contact with each other. That part of surface 4 which was formerly in plane 8 in contact with surface 6 now lies between A'-B' along line 8', surface 4 having been separated from surface 6 as aforesaid. Where only a single piece of fabric is used in making the garment part so closed by such closing seam, it is apparent from FIG. 3 that surface 4 coincides with surface 6 and surface 3 coincides with surface 5, fabric 1 coinciding with fabric 2. However, there may be other seams, for example, in the area C-C', which represents the remainder of the continuous configuration of fabric other than that in the immediate vicinity of the overlap. It is clear that the existence of one or more other seams in the C-C' area will have no effect on the principles applicable to the closing seam as described in this and the next preceding paragraph. Such other seams, if any, in the C-C' area might have been accomplished in the manner described above in connection with the discussion of FIG. 1, or as described above in connection with the discussion of FIG. 2 and FIG. 3 above.

The seams bonded as described above will be strong, will resist tearing, shearing or rupture, will contain no stitching or similar holes, and will provide an improved degree of protection from contamination. It requires fewer operations, less handling and less materials (such as fabric and thread) to produce a superior protective garment than any other known method of bonding the seams of such protective garments.

What is claimed is:

1. The method of making protective garments or parts thereof from fabric of non-woven spunbonded olefin or polyolefin having laminated to one side thereof a polyethylene or polyvinylidine chloride film, comprising:

a. overlapping the edges of pieces of said fabric to be bonded together so that a laminated surface of one piece of said fabric is in contact with an unlaminated surface of another piece of said fabric in the area of said overlap;

b. folding one of said pieces of said fabric around the edge of the other piece of said fabric back past the area of said overlap in such manner that an unlaminated surface of the said folded portion of the said fabric is in contact with an unlaminated surface of one of the said overlapping pieces of said fabric; and c. applying a combination of high-frequency ultrasound waves and pressure to the said pieces of fabric, so overlapped and folded, along the layers of overlap and fold.

2. The method in accordance with claim 1, wherein the said portion of the said fabric which was folded is separated from contact with the end of the piece of said fabric around which it was folded, subsequent to carrying out the steps set forth in claim 1.

* * * * *